UNITED STATES PATENT OFFICE.

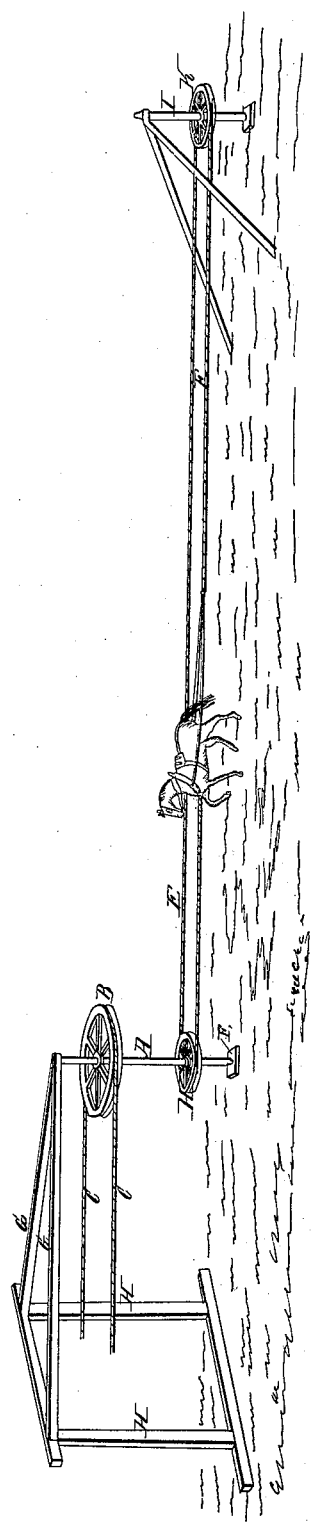

CHARLES HIBBARD, OF GUILFORD, NEW HAMPSHIRE.

HORSE-POWER FOR DRIVING MACHINERY.

Specification of Letters Patent No. 1,788, dated September 14, 1840.

*To all whom it may concern:*

Be it known that I, CHARLES HIBBARD, of Guilford, in the county of Strafford and State of New Hampshire, have invented new and useful Improvements in Machinery for Propelling by Horse-Power Threshing and other Machines; and I do hereby declare that the following is a full and exact description of the same, reference being had to the accompanying drawing, which, taken in connection with the said description, forms my specification.

The nature of my invention consists in a method of applying the strength or power of any required number of horses to the propelling of various kinds of machinery, by a very simple, easily constructed, durable and cheap machine, which runs with very little friction, and may be moved with ease from place to place.

To enable others skilled in the art to make and use my invention I will proceed to describe its construction and operation.

I first connect with a perpendicular shaft A, near to one end, a grooved wheel B, suitable for a band or belt C C to run over. Then between the wheel B and the foot of the shaft I place another pulley D on the shaft A said pulley D being deeply grooved to receive a band E E. I set up this wheel with the shaft in position varying somewhat from perpendicular if circumstances render the same necessary. The lower gudgeon of the shaft A runs in a suitable box placed in a sill or block F, which is confined to whatever it is placed on. The upper gudgeon runs in a box placed at the junction of two braces G G having their opposite ends screwed to the posts of barn doors, or the side of any building or posts H H set in the ground as the case may require. Then at forty yards, or any other convenient distance from the wheel, in any direction clear of obstacles another perpendicular shaft I is set up, with one end in the ground and braced at the top and having a loose pulley K thereon grooved in a similar manner to the first. The long band E E of tarred cord, or any other suitable substance, and of any desirable length, is next placed around the two pulleys D K sufficiently tight to prevent its slipping thereon. To this band a horse or horses are attached as seen in the drawing by one or more pieces of cord about three feet in length or in any convenient manner. By these, the horse or horses draw from the pulley D toward the pulley K, in a straight line; thence, they turn around the pulley K, and again draw as before, till they reach the pulley D, when they turn short around the shaft A and pulley D, at the same time passing under the wheel B and shorter band C. In this manner the long band moves with the horse or horses and turns the wheel B nearly around at each step they take. Said long band may be made of iron in the form of a flat linked chain to pass over a cogged wheel on the shaft in the place of the pulley D.

To apply the horsepower and communicate the motion of the wheel to a threshing machine it is only necessary to pass a band C C from the wheel B to the driving pulley of said machinery.

I claim as my invention—

Turning the shaft A by means of the long band E E, passing around pulleys D K to which band a horse or horses are attached; the whole being arranged and operating substantially in the manner and for the purposes herein above described.

In testimony that the above is a true description of my said invention and improvement I have hereto set my signature this twenty-ninth day of August in the year eighteen hundred and forty.

CHARLES HIBBARD.

Witnesses:
LYMAN B. WALKER,
BETTON W. SARGENT.